United States Patent [19]
Rich

[11] Patent Number: 5,561,890
[45] Date of Patent: Oct. 8, 1996

[54] INTELLIGENT CAM-DRIVEN CLAMP

[75] Inventor: Donald S. Rich, Long Valley, N.J.

[73] Assignee: Technology Handlers, Inc., Long Valley, N.J.

[21] Appl. No.: 275,542

[22] Filed: Jul. 15, 1994

[51] Int. Cl.$^6$ .................................................... F16B 19/00
[52] U.S. Cl. .............................. 24/453; 24/607; 403/322; 403/DIG. 6; 403/374; 294/94; 294/82.28
[58] Field of Search ............................ 24/453, 463, 603, 24/606, 607; 294/94, 82.28; 403/321, 322, DIG. 6, 373, 374; 411/348; 292/257

[56] References Cited

U.S. PATENT DOCUMENTS

| | | | |
|---|---|---|---|
| 3,117,484 | 1/1964 | Myers | 411/348 |
| 3,170,362 | 2/1965 | Mewse | 24/453 X |
| 4,643,472 | 2/1987 | Schukei et al. | 294/82.28 X |
| 4,865,485 | 9/1989 | Finnefrock, Sr. | 403/322 |
| 5,090,275 | 2/1992 | McCann | 403/322 X |
| 5,207,544 | 5/1993 | Yamamoto et al. | 24/453 X |
| 5,353,482 | 10/1994 | Ziaylek, Jr. et al. | 24/603 |
| 5,394,594 | 3/1995 | Duran | 24/453 |

FOREIGN PATENT DOCUMENTS

| | | | |
|---|---|---|---|
| 971537 | 9/1964 | United Kingdom | 411/348 |

*Primary Examiner*—Peter M. Cuomo
*Assistant Examiner*—Robert J. Sandy
*Attorney, Agent, or Firm*—Rohm & Monsanto

[57] ABSTRACT

A clamping arrangement employs a rotatable element, such as a ball, driven by a cam to apply a biasing force to an article desired to be clamped. The ball is contained within a housing having first and second through-holes arranged substantially orthogonal to one another. An elongated cam enters through one of the through-holes, and urges the ball to protrude through the other through-hole. The ball is larger than the through-hole through which it protrudes, and therefore does not exit the housing. In one embodiment, the cam is urged into communication with the ball by the application of air pressure to a pneumatic cylinder. The air pressure can be controlled to ensure that the biasing force applied by the ball is applied gently and resiliently to avoid jarring the article to be clamped, and displacing its contents. A position sensor is employed to provide an indication of the location of the pneumatic piston. The ball, in certain embodiments, is rotated as it is urged outward of the housing, whereby a downward component of the biasing force is imparted to the article to be clamped.

5 Claims, 2 Drawing Sheets

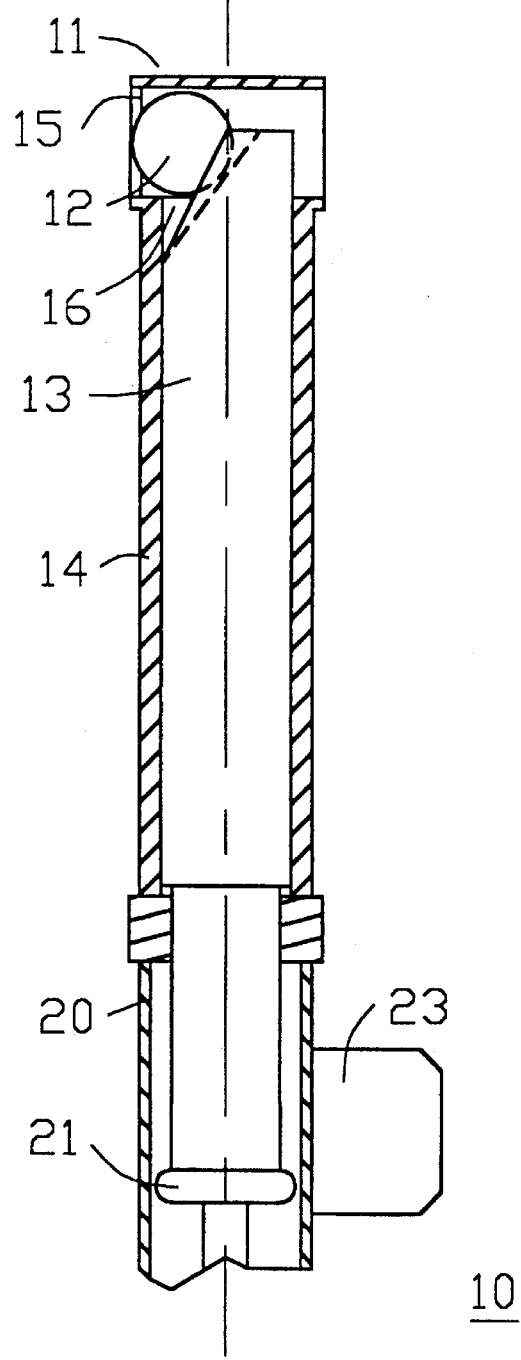

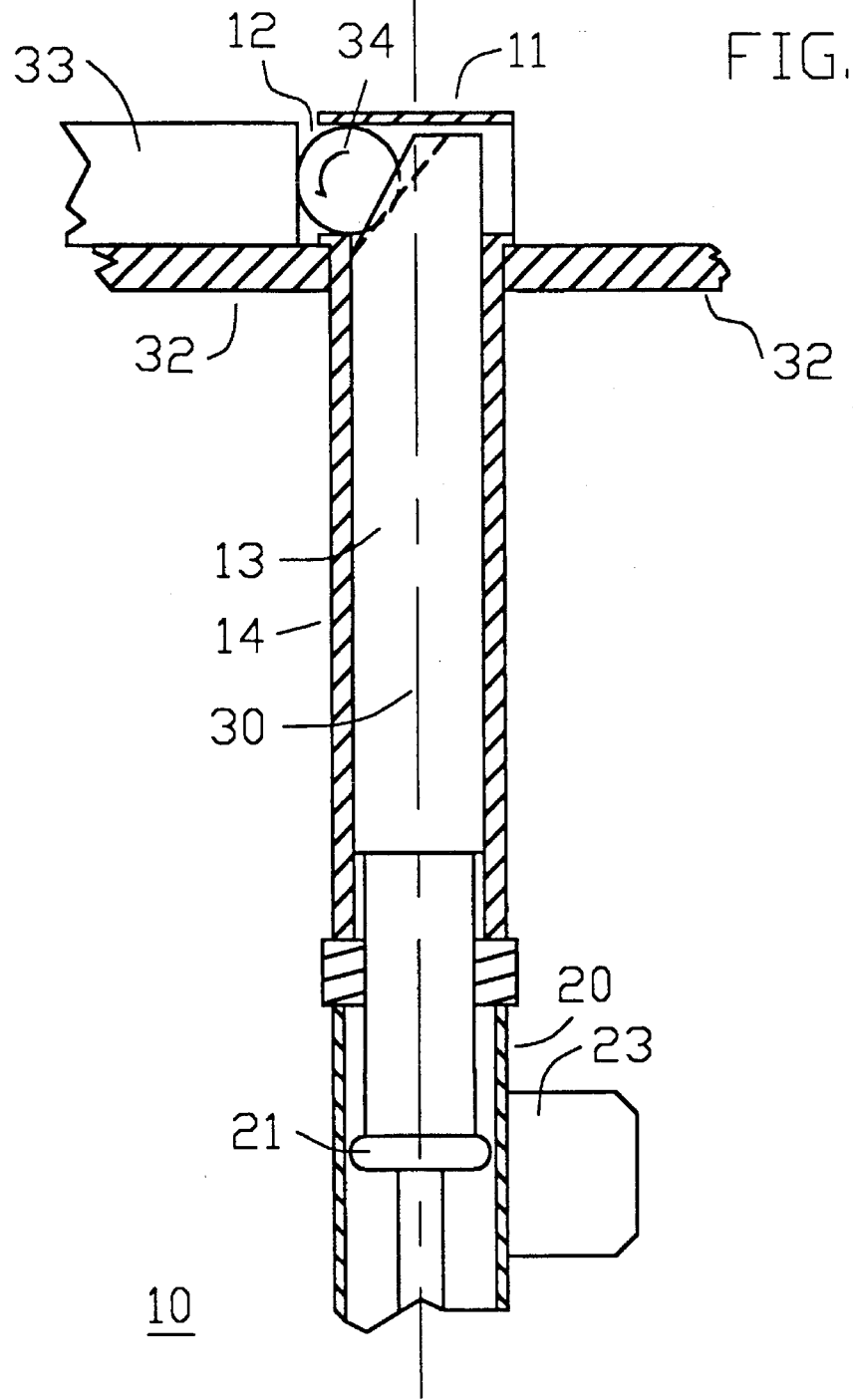

INTELLIGENT CAM-DRIVEN CLAMP

BACKGROUND OF THE INVENTION

1. Field of the Invention

This invention relates generally to clamping arrangements, and more particularly, to an arrangement for applying a biasing force to an article desired to be retained in a predetermined position.

2. Description of the Related Art

There are a number of applications wherein it is desired to apply a biasing force to an article so that it is retained in a predetermined position while some other operation is performed thereon. For example, in the semiconductor industry, it is desired that trays of integrated circuit chips be presented onto a work plate or table and retained in a fixed position against a stop while the integrated circuit chips therein are inspected or otherwise processed. Such processing can include, for example, machine-vision inspection or electrical testing.

It is additionally desired in this illustrative application that the biasing force which is applied to the tray be firm, but be applied resiliently to avoid imparting a jolt or a physical shock to the tray whereby the integrated circuit chips thereon may become displaced. It is additionally desired that as the biasing force is applied to urge the tray against the stop, there also be applied a downward resilient force component whereby the tray is held firmly against the work plate.

Usually, there is not available any significant amount of space on the work plate for a clamping arrangement, accordingly, there is a need for a clamping arrangement that requires only a very small footprint on the work plate.

It is, therefore, an object of this invention to provide a simple and economical clamping arrangement that does not require significant footprint space on a work plate.

It is another object of this invention to provide a clamping arrangement that can provide a resilient biasing force to the article desired to be clamped.

It is also an object of this invention to provide a clamping arrangement that effects a resilient biasing force having horizontal and downward components.

It is a further object of this invention to provide an intelligent clamping arrangement that provides a detectable indication of its engaged and disengaged states.

SUMMARY OF THE INVENTION

The foregoing and other objects are achieved by this invention which provides, in a first apparatus aspect thereof, a clamping arrangement for applying a biasing force to an article that is desired to be clamped. In accordance with the invention, the clamping arrangement is provided with a housing having first and second through-holes arranged substantially orthogonal to one another. The first and second through-holes each have a respective aperture dimension. In this aspect of the invention, a ball is disposed in the housing the ball having a dimension, such as a diameter dimension, that is larger than the aperture dimension of the first through-hole. A cam is arranged to enter the housing through the second through-hole. The cam has an elongated configuration along a primary axis, and is configured to produce increasing lateral displacement along the primary axis, whereby as the cam is urged into the second through-hole, the ball is urged increasingly outward of the housing through the first through-hole, whereby it communicates and applies a biasing force to the article desired to be clamped.

In one embodiment of the invention, the ball has a dimension that is larger than the aperture dimension of the second through-hole. Thus, the ball will not fall or roll directly out of the housing when the cam is removed, such as for cleaning or maintenance. In one highly advantageous embodiment of the invention, the cam is concavely radiused so as to conform to the round contour of the ball.

A drive arrangement, which in some embodiments may be a pneumatic cylinder, is coupled to the cam for displacing same along a path parallel to the primary axis. Such displacement is achieved between a first axial position where the ball is disposed substantially within the housing, and a second axial position where the ball is disposed partially outside of the housing, and in communication with the article desired to be clamped.

In a further embodiment of the invention, there is provided a sensor, illustratively in the vicinity of the pneumatic cylinder, for producing a detectable indication of the position of the pneumatic cylinder, and correspondingly whether the ball is engaged or disengaged with respect to the article desired to be clamped.

In a practical embodiment of the invention, there is provided a cam guide coupled to the housing for forming a guideway for the cam. The other end of the cam guide, distal from the end coupled to the housing, may, in certain embodiments, be coupled to the drive arrangement.

In accordance with a further apparatus embodiment of the invention, a clamping arrangement is provided for applying a biasing force to an article desired to be clamped. A housing is provided having first and second through-holes arranged substantially orthogonal to one another, the first and second through-holes each having a respective aperture dimension, as described hereinabove with respect to the first aspect of the invention. A ball is arranged at the housing, the ball having a dimension that is larger than the aperture dimension of the first through-hole. A cam, which is arranged to enter the housing through the second through-hole, and which has an elongated configuration along a primary axis thereof having an increasing lateral displacement along the primary axis, is urged, at a first end thereof into the second through-hole. The ball is thus urged increasingly outward of the housing through the first through-hole, whereby it communicates with and applies a biasing force to the article desired to be clamped. A drive arrangement is coupled to a second end of the cam for moving same with respect to the ball. The drive arrangement is provided with a drive housing that encloses same, and which is coupled to a cam guide, the cam guide forming a guideway for the cam. A sensor provides a detectable condition responsive to the axial position of the drive.

In accordance with a specific illustrative embodiment of this further aspect of the invention, the cam is provided with a ball engagement surface, as previously described. A resilient force is applied to the cam by means of a pneumatic cylinder that is moved in response to the application of air pressure. The rate at which air is introduced into the clamping arrangement is controlled in a manner known to persons of skill in the art to provide a resilient effect that avoids jarring or otherwise imparting impacts to the article desired to be clamped.

In accordance with a still further aspect of the invention, a clamping arrangement is provided for applying a resilient biasing force to an article desired to be resiliently clamped. In accordance with the invention, a housing is provided having first and second through-holes arranged substantially orthogonal to one another, the first and second through-holes each having a respective aperture dimension. A rotatable element is arranged in the housing, the rotatable element having a diametrical dimension that is larger than the aperture dimension of the first through-hole. A cam is arranged to enter the housing through the second through-hole, the cam having an elongated configuration and further being configured to produce increasing lateral displacement along a primary axis, as previously described. A pneumatic drive is coupled to the second end of the cam for resiliently urging the cam into communication with the rotatable element.

In accordance with the principles of the invention, the rotatable element need not be spherical, in the shape of a ball, but may have another configuration, such as a cylindrical configuration, that has a diametrical dimension. The rotatable element communicates with an engagement surface of the cam, whereby a rotative force is applied such that when the rotatable element communicates with the article desired to be stacked, a resilient biasing force component is applied to the article in a direction opposite to the direction of travel of the cam as the rotatable element is urged into communication with the article desired to be resiliently clamped. In such an arrangement, the materials or surface finishes of the rotatable element and/or the cam are designed to produce less slippage than the communication between the rotatable element and the housing, particularly at the edge of the first through-hole.

BRIEF DESCRIPTION OF THE DRAWING

Comprehension of the invention is facilitated by reading the following detailed description, in conjunction with the annexed drawing, in which:

FIG. 1 is a partially cross-sectional simplified schematic representation of a clamping arrangement constructed in accordance with the principles of the invention and employing a ball as the clamping element;

FIG. 2 is a top view, shown partially in phantom, of the embodiment of FIG. 1, while the ball is in a disengaged state;

FIG. 3 is a simplified partially cross-sectional schematic representation as in FIG. 1, showing the ball in a clamping state, i.e., partially protruding from the housing; and FIG. 4 is a top view of FIG. 3, also showing the protruding ball.

DETAILED DESCRIPTION

FIG. 1 is a partially cross-sectional simplified schematic representation of a side view of a clamping arrangement 10. Clamping arrangement 10 has a housing 11 containing, in this embodiment, a ball 2. Ball 12 is shown to be in communication with a cam 13 that has an elongated configuration and is arranged in a cam guide 14. The cam guide is coupled to housing 11 where the ball is disposed. It is to be understood that the invention herein is not limited to the use of a ball as the clamping element. Other shapes for the clamping element, such as cylindrical, elliptical, or asymmetrical egg-like shape may be employed in the practice of the invention.

Housing 11 has a first through-hole 15 that is dimensioned to be smaller than ball 12. There is additionally provided a second through-hole 16 that is a arranged to be orthogonal with respect to first through-hole 15, and which is in registration with cam guide 14. Thus, cam 13 communicates with ball 12 by entering housing 11 via second through-hole 16.

Cam guide 14 is shown to be coupled to a pneumatic cylinder 20 that contains therein a pneumatic piston 2 1 that is coupled to cam 13. There is additionally provided a position sensor 23 that produces a detectable indication responsive to the position of pneumatic piston 21 within pneumatic cylinder 20. In some embodiments of the invention, position sensor 23 produces an electrical signal responsive to the position of the pneumatic piston.

FIG. 2 is a top view of the embodiment of FIG. 1, shown partially in phantom representation. As shown, housing 11 has an hexagonal configuration. Ball 12 is shown to be, in this embodiment, contained entirely within housing 11, signifying a disengaged state.

FIG. 3 is a schematic representation that corresponds to the embodiment of FIG. 1, except that pneumatic piston 21 has been actuated to urge cam 13 into further communication with ball 12. As shown, cam 13 has an elongated configuration that extends along a primary axis 30. The portion of cam 13 that enters housing 11 is shown to offer increasing lateral displacement as the cam is urged into the housing by operation of the pneumatic piston. In this specific illustrative embodiment of the invention, the dashed line illustrates that the portion of cam 13 that communicates with ball 12 is radiused to match the round contour of ball 12. Such an adaptation of the engagement surface to conform to the outer contour of the ball reduces wear on the cam and additionally serves to maintain the ball in substantially constant orientation with respect to the cam. Ball 12 in this figure is shown to be protruding from first through-hole 15 of the housing.

FIG. 4 is a top view of the embodiment of FIG. 3, and corresponds to the illustration of FIG. 2. As shown in FIG. 4, ball 12 protrudes from hexagonal housing 11, signifying an engaged, or clamping, state.

Referring once again to FIG. 3, this figure shows clamping arrangement 10 to be installed on a work plate, or surface 32. Work plate 32, is shown cross-sectionally in this figure. Any form of known mounting arrangement can be employed to install the clamping arrangement into the work plate. In this specific embodiment, cam guide 14 is inserted with an interference fit into the opening in work plate 32.

The air pressure that is applied to pneumatic piston 21 is controllable in a manner known to persons of skill in the an so as to cause cam 13 to be urged gently into communication with ball 12. Thus, ball 12 exerts a resilient force against the article desired to be clamped, which article is represented schematically in FIG. 3 and designated as article 33.

In certain embodiments of the invention, the motion of cam 13 as it communicates with ball 12 causes the ball to rotate in the direction of arrow 34. Such rotation causes a downward component of force to be imparted to article 33 whereby it is urged against work plate 32. Thus, the article is clamped against a stop (not shown) and simultaneously urged downward. Persons of skill in the art can configure the surfaces of engagement between cam 13 and ball 12, or their material, so as to produce less slippage than the communication between ball 12 and housing 11 at the edge of first through-hole 15.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. A clamping arrangement for applying a resilient biasing force to an article desired to be clamped, the clamping arrangement comprising:

a housing having first and second through-holes arranged substantially orthogonal to one another, said first and second through-holes each having a respective aperture dimension;

rotatable means arranged in said housing, said rotatable means having a diametrical dimension that is larger than said aperture dimension of said first through-hole, and having a predetermined-rotatable means surface contour; and cam means arranged to enter said housing through said second through-hole, said cam means having an elongated configuration along a primary axis thereof and being configured with increasing lateral displacement along said primary axis, said cam means being provided with an elongated rotatable means engagement surface for communicating with said rotatable means, said rotatable means engagement surface being configured to conform substantially to said rotatable means surface contour, whereby as a first end of said cam means is urged into said second through-hole, said rotatable means is urged into communication with said ball engagement surface and increasingly outward of said housing through said first through-hole so as to communicate with and apply a biasing force to the article desired to be clamped;

pneumatic drive means coupled to a second end of said cam means for resiliently urging said cam means; a pneumatic drive housing for enclosing said pneumatic drive means; and cam guide means coupled at a first end thereof to said housing for forming a guideway for said cam means and at a second end thereof to said pneumatic drive housing.

2. The clamping arrangement of claim 1 wherein there is further provided sensor means coupled to said pneumatic drive housing for producing a detectable condition responsive to the axial position of said pneumatic drive means.

3. The clamping arrangement of claim 1 wherein rotatable means comprises ball means, and said cam means is provided with a ball engagement surface for communicating with said ball means, said ball engagement surface being configured to conform to a surface contour of said ball means, whereby a rotative force is applied to said ball means whereby a resilient biasing force component is applied to the article in a direction opposite to a direction of travel of said cam means as said ball means is urged into communication with the article desired to be resiliently clamped.

4. The clamping arrangement of claim 3 wherein the article desired to be clamped is disposed on a substantially horizontal plate, and there is further provided means for mounting the clamping arrangement onto the substantially horizontal plate, whereby said housing extends above the substantially horizontal plate, said resilient biasing force component being applied to urge the article toward the substantially horizontal plate.

5. The clamping arrangement of claim 1 wherein the communication between said rotatable means and said cam means produces less slippage than the communication between said rotatable means and said housing.

* * * * *